US012700912B2

(12) United States Patent
Elshafie et al.

(10) Patent No.: US 12,700,912 B2
(45) Date of Patent: Aug. 4, 2026

(54) DOWNLINK CONTROL INFORMATION FOR RECONFIGURABLE INTELLIGENT SURFACE BEAM TRAINING

(71) Applicant: QUALCOMM Incorporated, San Diego, CA (US)

(72) Inventors: Ahmed Elshafie, San Diego, CA (US); Yu Zhang, San Diego, CA (US); Huilin Xu, Temecula, CA (US); Alexandros Manolakos, Escondido, CA (US); Saeid Sahraei, San Diego, CA (US); Hung Dinh Ly, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 376 days.

(21) Appl. No.: 18/553,468

(22) PCT Filed: Jul. 1, 2021

(86) PCT No.: PCT/CN2021/104016
§ 371 (c)(1),
(2) Date: Sep. 29, 2023

(87) PCT Pub. No.: WO2023/272682
PCT Pub. Date: Jan. 5, 2023

(65) Prior Publication Data
US 2024/0187086 A1 Jun. 6, 2024

(51) Int. Cl.
*H04B 7/04* (2017.01)
*H04B 7/06* (2006.01)
(Continued)

(52) U.S. Cl.
CPC ..... *H04B 7/15528* (2013.01); *H04B 7/04013* (2023.05); *H04B 7/0617* (2013.01); *H04W 72/232* (2023.01)

(58) Field of Classification Search
None
See application file for complete search history.

(56) References Cited

U.S. PATENT DOCUMENTS 9,706,380 B1 * 7/2017 Murchison ............ H04W 4/021
2018/0367203 A1 * 12/2018 Nilsson .................. H04B 7/088
(Continued)

FOREIGN PATENT DOCUMENTS

CN        107078769 A     8/2017
WO    WO-2021109345 A1    6/2021

OTHER PUBLICATIONS

International Search Report and Written Opinion—PCT/CN2021/104016—ISA/EPO—Mar. 30, 2022.
(Continued)

*Primary Examiner* — Minh Trang T Nguyen
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, downlink control information (DCI) associated with a reconfigurable intelligence surface (RIS) beam training, wherein the DCI configures an RIS controller and the UE for the RIS beam training. The UE may transmit, to the base station, a report based at least in part on the DCI associated with the RIS beam training. Numerous other aspects are described.

30 Claims, 12 Drawing Sheets

700 ➞

710 ∽ Receive, from a base station, downlink control information (DCI) associated with a reconfigurable intelligence surface (RIS) beam training, wherein the DCI configures an RIS controller and the UE for the RIS beam training 720 ∽ Transmit, to the base station, a report based at least in part on the DCI associated with the RIS beam training

(51) Int. Cl.
    *H04B 7/155*       (2006.01)
    *H04W 72/232*    (2023.01)

(56)             References Cited

U.S. PATENT DOCUMENTS

| | | | |
|---|---|---|---|
| 2019/0306732 A1* | 10/2019 | Dhanapal | H04W 16/32 |
| 2020/0383118 A1 | 12/2020 | Park et al. | |
| 2020/0403687 A1 | 12/2020 | Raghavan et al. | |
| 2021/0067233 A1* | 3/2021 | Guan | H04B 7/088 |
| 2024/0146385 A1* | 5/2024 | Chen | H04B 7/088 |
| 2024/0250720 A1* | 7/2024 | Shen | H04B 7/0473 |
| 2024/0259052 A1* | 8/2024 | Wang | H04L 27/2602 |

OTHER PUBLICATIONS

Jung, et al., "On the Optimality of Reconfigurable Intelligent Surfaces (RISs): Passive Beamforming, Modulation, and Resource Allocation", IEEE Transactions on Wireless Communications, Feb. 18, 2021 (Feb. 18, 2021), 16 Pages, The Whole Document.
ZTE, et al., "Support of Reconfigurable Intelligent Surface for 5G Advanced", 3GPP Draft, 3GPP TSG RAN Meeting #91e, RP-210618, Electronic Meeting, Mar. 16, 2021-Mar. 21, 2021, Mar. 15, 2021, 7 Pages, the whole document, pp. 2-6.

* cited by examiner

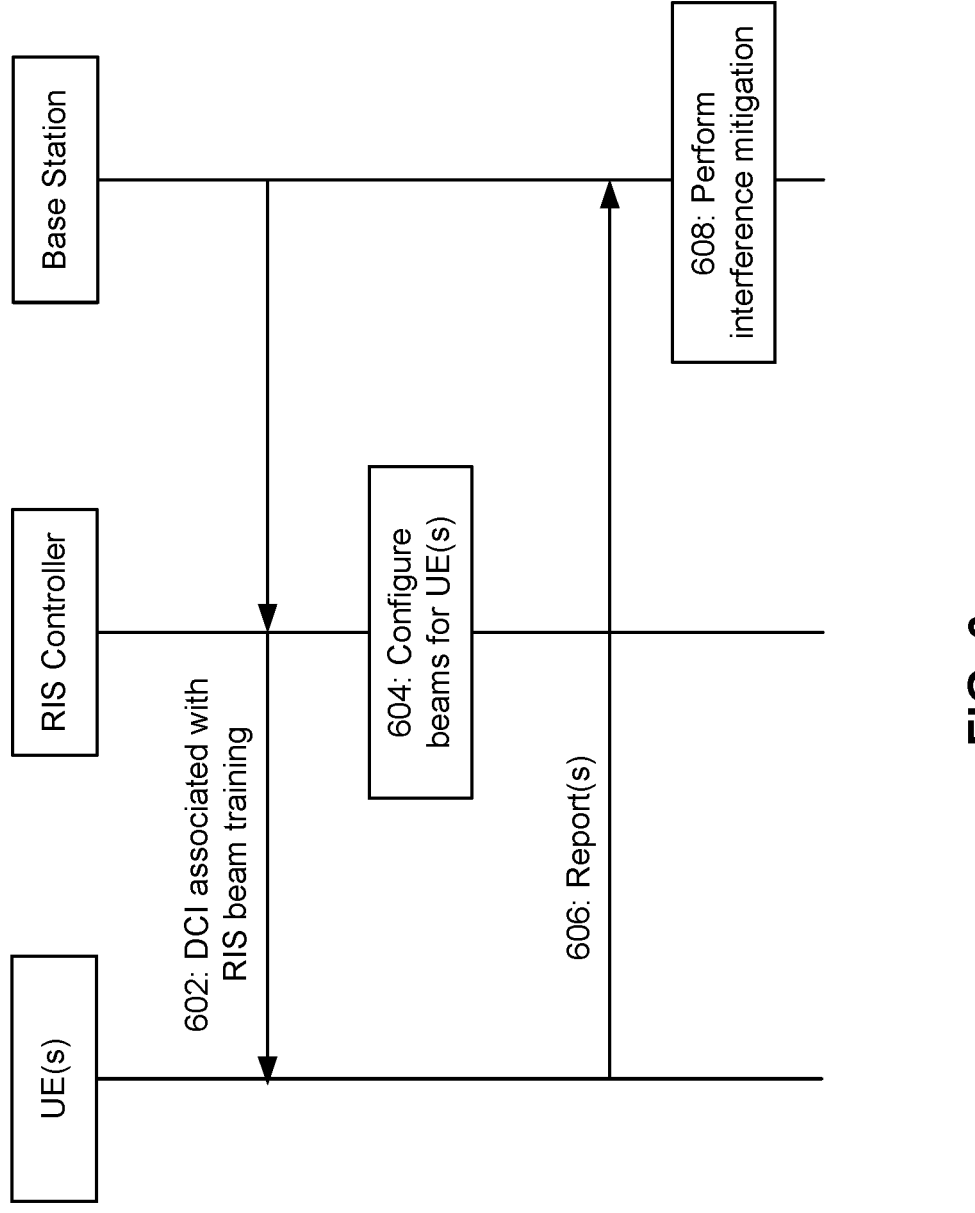
FIG. 6
600

Receive, from a base station, downlink control information (DCI) associated with a reconfigurable intelligence surface (RIS) beam training, wherein the DCI configures an RIS controller and the UE for the RIS beam training

710

Transmit, to the base station, a report based at least in part on the DCI associated with the RIS beam training

720

700

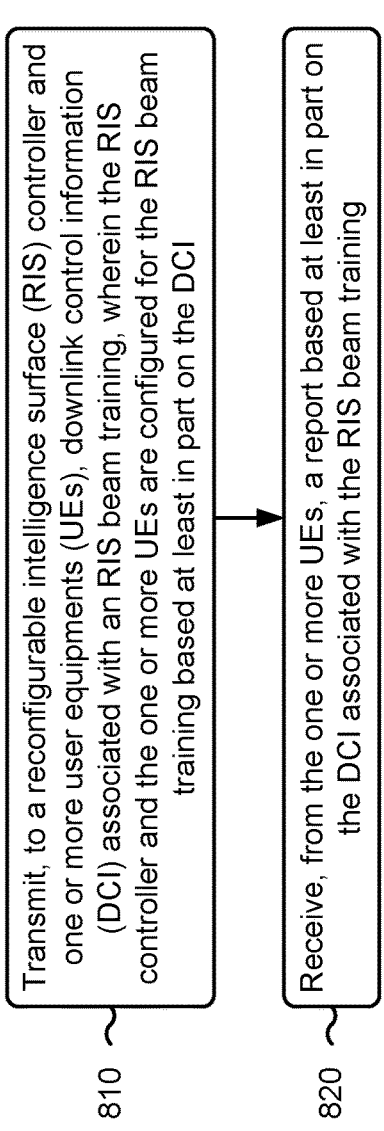

810 — Transmit, to a reconfigurable intelligence surface (RIS) controller and one or more user equipments (UEs), downlink control information (DCI) associated with an RIS beam training, wherein the RIS controller and the one or more UEs are configured for the RIS beam training based at least in part on the DCI 820 — Receive, from the one or more UEs, a report based at least in part on the DCI associated with the RIS beam training

910 — Receive, from a base station, downlink control information (DCI) associated with an RIS beam training, wherein the DCI configures the RIS controller and one or more user equipments (UEs) for the RIS beam training 920 — Configure one or more beams for the one or more UEs based at least in part on the DCI associated with the RIS beam training

900

DOWNLINK CONTROL INFORMATION FOR RECONFIGURABLE INTELLIGENT SURFACE BEAM TRAINING

CROSS-REFERENCE TO RELATED APPLICATION

This Patent Application is a 371 national stage of PCT Application No. PCT/CN2021/104016 filed on Jul. 1, 2021, entitled "DOWNLINK CONTROL INFORMATION FOR RECONFIGURABLE INTELLIGENT SURFACE BEAM TRAINING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for downlink control information (DCI) for reconfigurable intelligent surface (RIS) beam training.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: receive, from a base station, downlink control information (DCI) associated with a reconfigurable intelligence surface (RIS) beam training, wherein the DCI configures an RIS controller and the UE for the RIS beam training; and transmit, to the base station, a report based at least in part on the DCI associated with the RIS beam training.

In some implementations, an apparatus for wireless communication at a base station includes a memory and one or more processors, coupled to the memory, configured to: transmit, to an RIS controller and one or more UEs, DCI associated with an RIS beam training, wherein the RIS controller and the one or more UEs are configured for the RIS beam training based at least in part on the DCI; and receive, from the one or more UEs, a report based at least in part on the DCI associated with the RIS beam training.

In some implementations, an apparatus for wireless communication at an RIS controller includes a memory and one or more processors, coupled to the memory, configured to: receive, from a base station, DCI associated with an RIS beam training, wherein the DCI configures the RIS controller and one or more UEs for the RIS beam training; and configure one or more beams for the one or more UEs based at least in part on the DCI associated with the RIS beam training.

In some implementations, a method of wireless communication performed by a UE includes receiving, from a base station, DCI associated with an RIS beam training, wherein the DCI configures an RIS controller and the UE for the RIS beam training; and transmitting, to the base station, a report based at least in part on the DCI associated with the RIS beam training.

In some implementations, a method of wireless communication performed by a base station includes transmitting, to an RIS controller and one or more UEs, DCI associated with an RIS beam training, wherein the RIS controller and the one or more UEs are configured for the RIS beam training based at least in part on the DCI; and receiving, from the one or more UEs, a report based at least in part on the DCI associated with the RIS beam training.

In some implementations, a method of wireless communication performed by an RIS controller includes receiving, from a base station, DCI associated with an RIS beam training, wherein the DCI configures the RIS controller and one or more UEs for the RIS beam training; and configuring one or more beams for the one or more UEs based at least in part on the DCI associated with the RIS beam training.

In some implementations, a non-transitory computer-readable medium storing a set of instructions for wireless communication includes one or more instructions that, when executed by one or more processors of a UE, cause the UE to: receive, from a base station, DCI associated with an RIS beam training, wherein the DCI configures an RIS controller and the UE for the RIS beam training; and transmit, to the base station, a report based at least in part on the DCI associated with the RIS beam training.

In some implementations, a non-transitory computer-readable medium storing a set of instructions for wireless communication includes one or more instructions that, when executed by one or more processors of a base station, cause the base station to: transmit, to an RIS controller and one or more UEs. DCI associated with an RIS beam training, wherein the RIS controller and the one or more UEs are configured for the RIS beam training based at least in part on the DCI; and receive, from the one or more UEs, a report based at least in part on the DCI associated with the RIS beam training.

In some implementations, a non-transitory computer-readable medium storing a set of instructions for wireless communication includes one or more instructions that, when executed by one or more processors of an RIS controller, cause the RIS to: receive, from a base station, DCI associated with an RIS beam training, wherein the DCI configures the RIS controller and one or more UEs for the RIS beam training; and configure one or more beams for the one or more UEs based at least in part on the DCI associated with the RIS beam training.

In some implementations, an apparatus for wireless communication includes means for receiving, from a base station, DCI associated with an RIS beam training, wherein the DCI configures an RIS controller and the apparatus for the RIS beam training; and means for transmitting, to the base station, a report based at least in part on the DCI associated with the RIS beam training.

In some implementations, an apparatus for wireless communication includes means for transmitting, to an RIS controller and one or more UEs. DCI associated with an RIS beam training, wherein the RIS controller and the one or more UEs are configured for the RIS beam training based at least in part on the DCI; and means for receiving, from the one or more UEs, a report based at least in part on the DCI associated with the RIS beam training.

In some implementations, an apparatus for wireless communication includes means for receiving, from a base station, DCI associated with an RIS beam training, wherein the DCI configures the apparatus and one or more UEs for the RIS beam training; and means for configuring one or more beams for the one or more UEs based at least in part on the DCI associated with the RIS beam training.

Aspects generally include a method, apparatus, system, computer program product, non-transitory computer-readable medium, user equipment, base station, RIS controller, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example associated with downlink control information (DCI) for RIS beam training, in accordance with the present disclosure.

FIGS. 7-9 are diagrams illustrating example processes associated with DCI for RIS beam training, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
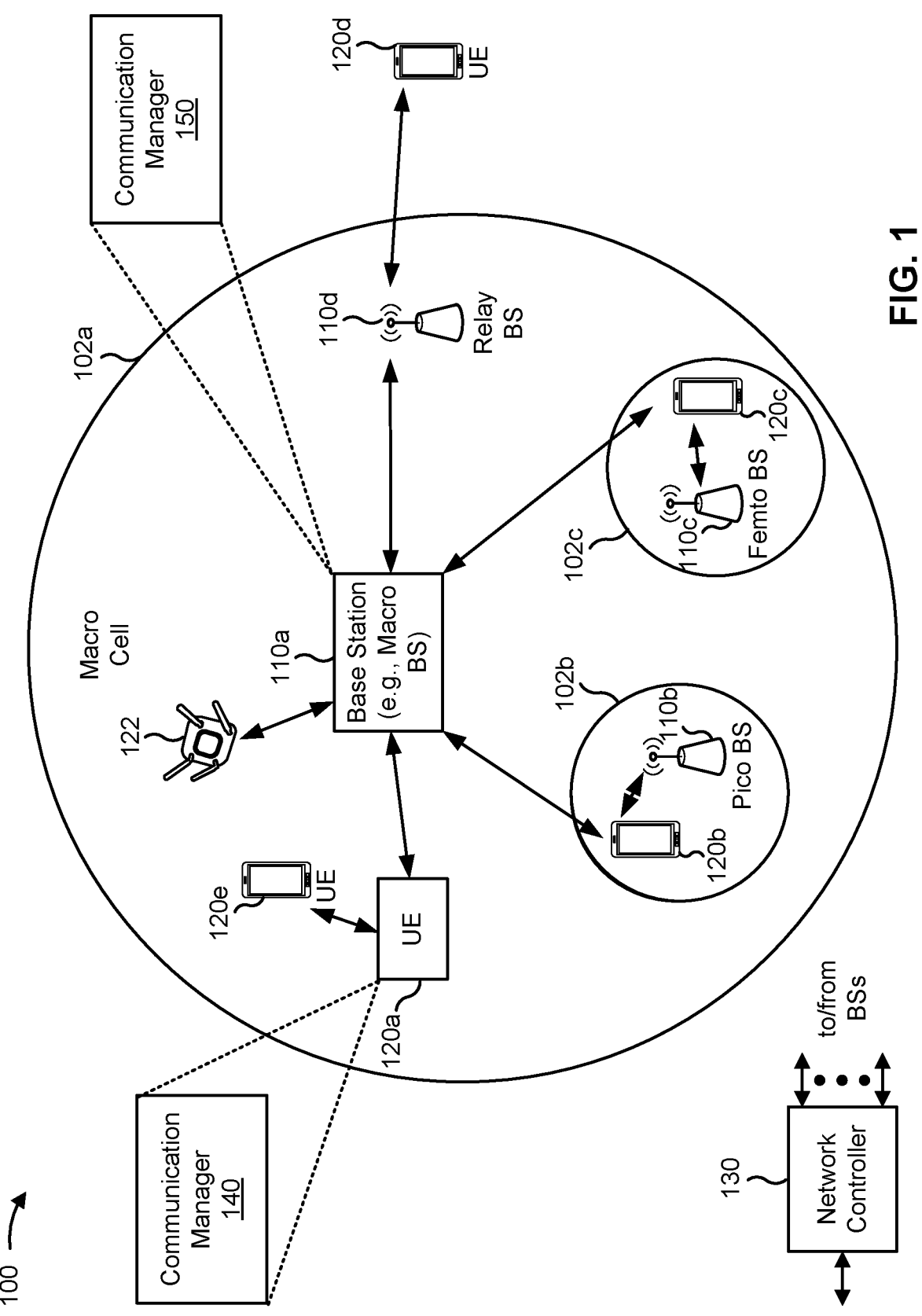
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a base station, downlink control information (DCI) associated with a reconfigurable intelligent surface (RIS) beam training, wherein the DCI configures an RIS controller and the UE for the RIS beam training; and transmit, to the base station, a report based at least in part on the DCI associated with the RIS beam training. Additionally, or alternatively, the communication manager 140 may perform one or more other operations described herein.

In some aspects, a base station (e.g., base station 110) may include a communication manager 150. As described in more detail elsewhere herein, the communication manager 150 may transmit, to an RIS controller and one or more UEs, DCI associated with an RIS beam training, wherein the RIS controller and the one or more UEs are configured for the RIS beam training based at least in part on the DCI; and receive, from the one or more UEs, a report based at least in part on the DCI associated with the RIS beam training. Additionally, or alternatively, the communication manager 150 may perform one or more other operations described herein.

As indicated above. FIG. 1 is provided as an example. Other examples may differ from what is described with regard to FIG. 1.

Figure 2:
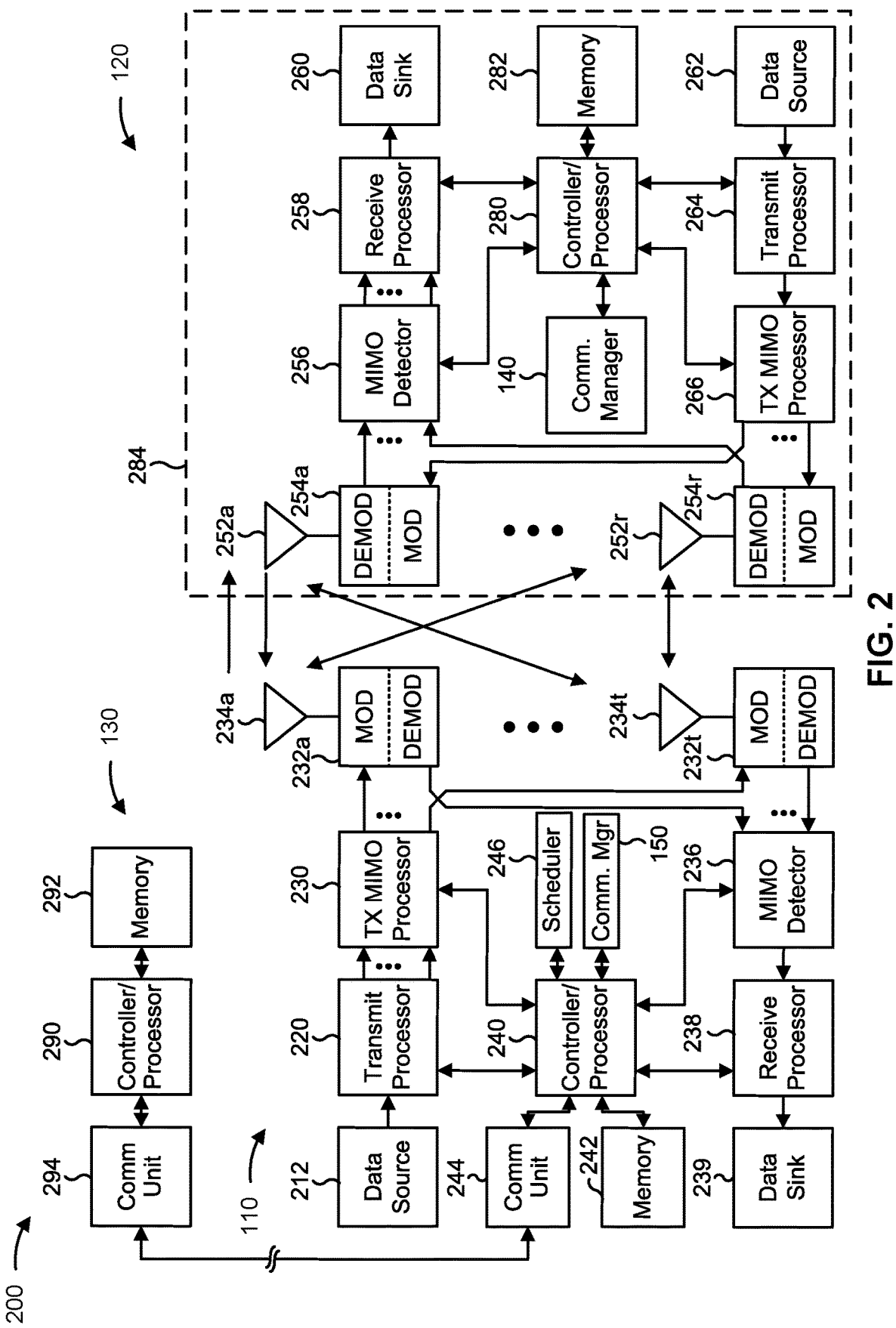
FIG. 2 is a diagram illustrating an example of a base station in communication with a user equipment (UE) in a wireless network, in accordance with the present disclosure.

FIG. 2 is a diagram illustrating an example 200 of abase station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-9).

The controller/processor 240 of the base station 110, the controller/processor 280 of the UE 120, and/or any other component(s) of FIG. 2 may perform one or more techniques associated with DCI for RIS beam training, as described in more detail elsewhere herein. In some aspects, the RIS controller described herein is the base station 110, is included in the base station 110, or includes one or more components of the base station 110 shown in FIG. 2. In some aspects, the RIS controller described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., UE 120) may include means for receiving, from abase station, DCI associated with an RIS beam training, wherein the DCI configures an RIS controller and the UE for the RIS beam training, and/or means for transmitting, to the base station, a report based at least in part on the DCI associated with the RIS beam training. In some aspects, such means may include one or more components of UE 120 described in connection with FIG. 2, such as controller/processor 280, transmit processor 264, TX MIMO processor 266, antenna 252, modem 254, MIMO detector 256, and/or receive processor 258.

In some aspects, a base station (e.g., base station 110) may include means for transmitting, to an RIS controller and one or more UEs, DCI associated with an RIS beam training, wherein the RIS controller and the one or more UEs are configured for the RIS beam training based at least in part on the DCI, and/or means for receiving, from the one or more UEs, a report based at least in part on the DCI associated with the RIS beam training. In some aspects, such means may include one or more components of base station 110 described in connection with FIG. 2, such as antenna 234, MIMO detector 236, receive processor 238, controller/processor 240, transmit processor 220. TX MIMO processor 230, modem 232, and/or antenna 234.

In some aspects, an RIS controller may include means for receiving, from a base station. DCI associated with an RIS beam training, wherein the DCI configures the RIS controller and one or more UEs for the RIS beam training, and/or means for configuring one or more beams for the one or more UEs based at least in part on the DCI associated with the RIS beam training. In some aspects, such means may include one or more components of UE 120 described in connection with FIG. 2, such as controller/processor 280, transmit processor 264, TX MIMO processor 266, antenna 252, modem 254, MIMO detector 256, and/or receive processor 258. In some aspects, such means may include one or more components of base station 110 described in connection with FIG. 2, such as antenna 234, MIMO detector 236, receive processor 238, controller/processor 240, transmit processor 220, TX MIMO processor 230, modem 232, and/or antenna 234.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above. FIG. 2 is provided as an example. Other examples may differ from what is described with regard to FIG. 2.

Massive MIMO may achieve increased throughput in an NR system. Massive MIMO may achieve high beamforming gain by using active antenna units. Massive MIMO may involve individual RF chains per antenna port. The high beamforming gain and/or the individual RF chains per antenna port may in part result in the increased throughput.

RISs are network elements that are employed to extend NR coverage with negligible power consumption. An RIS may be a mirror-like near passive device. The RIS may include X elements in a horizontal direction and Y elements in a vertical direction. In other words, the RIS may be comprised of X by Y elements. Each element may reflect a waveform that is incident to a surface of the element. The waveform may be transmitted by a base station or a UE. Each element may reflect the waveform based at least in part on a reflection coefficient, such that the waveform may be reflected to a direction. The waveform that strikes the element may be an incident waveform, and the waveform that is reflected from the element may be a reflected waveform. The direction toward which the waveform is reflected may be a function of the reflection coefficient and/or a phase associated with the element that reflects the waveform.

The direction toward which the waveform is reflected, or a reflection direction, may be controlled by the base station. For example, the base station may transmit an indication of a reflection direction to an RIS controller associated with the RIS. The indication of the reflection direction may indicate the reflection coefficient and/or phase for each element associated with the RIS. The RIS controller may adjust the reflection coefficient and/or phase for each element based at least in part on the indication received from the base station.

Figure 3:
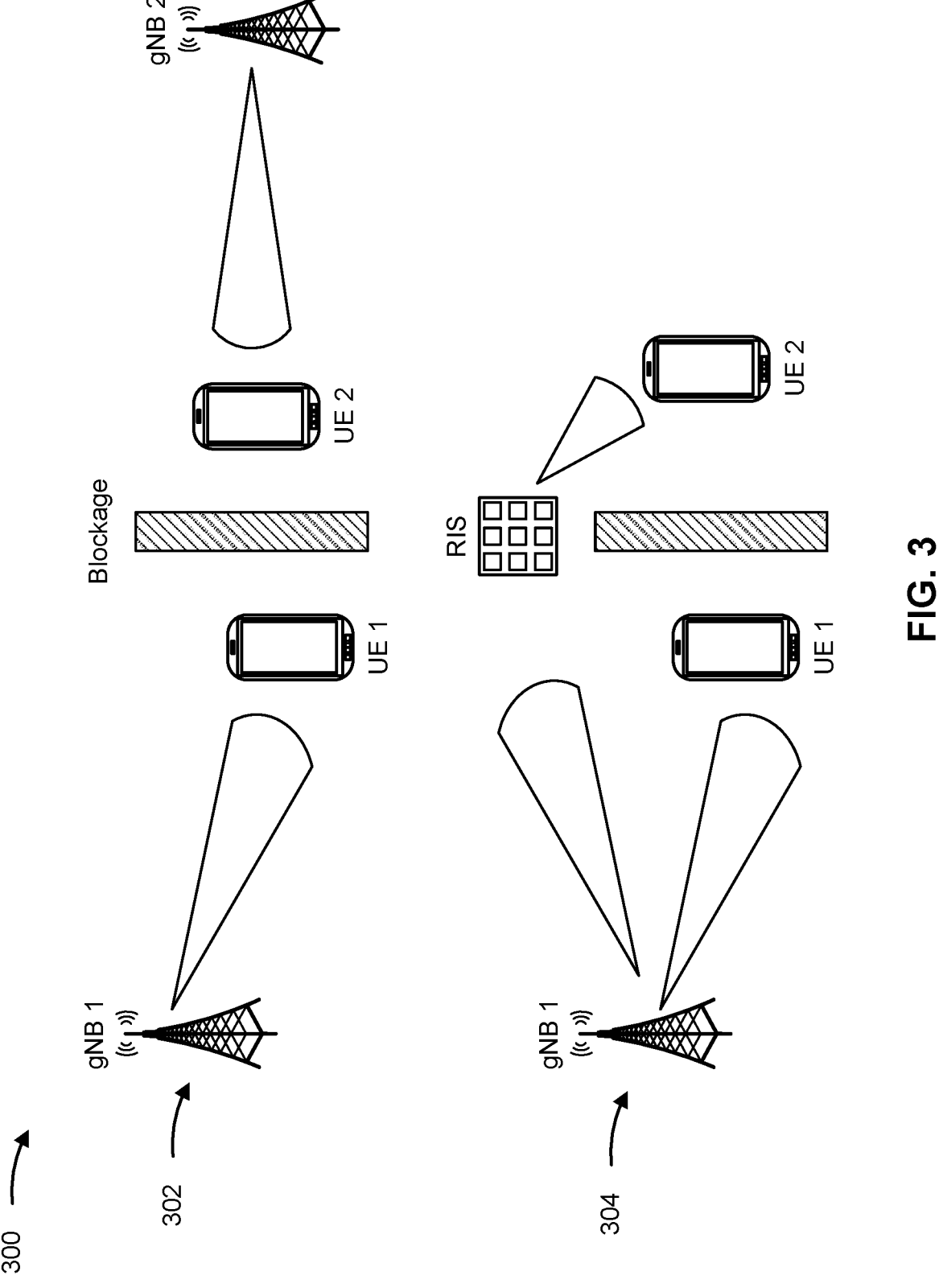
FIG. 3 is a diagram illustrating an example of a reconfigurable intelligent surface (RIS), in accordance with the present disclosure.

FIG. 3 is a diagram illustrating an example 300 of an RIS, in accordance with the present disclosure.

As shown by reference number 302, a first base station (gNB1) may transmit a first downlink transmission to a first UE (UE1). A second base station (gNB2) may transmit a second downlink transmission to a second UE (UE2). The first UE and the second UE may be separated by a blockage. As a result, downlink transmissions from the first base station may not be received by the second UE, and downlink transmissions from the second base station may not be received by the first UE.

As shown by reference number 304, an RIS may be employed in proximity to the blockage. The first base station may transmit a first downlink transmission to the first UE and a second downlink transmission to the RIS. The RIS may include a plurality of elements that reflect the second downlink transmission in a direction toward the second UE. As a result, the first base station may effectively perform downlink transmissions to the second UE via the RIS, even though the blockage is present between the first base station and the second UE.

As indicated above, FIG. 3 is provided as an example. Other examples may differ from what is described with regard to FIG. 3.

Figure 4:
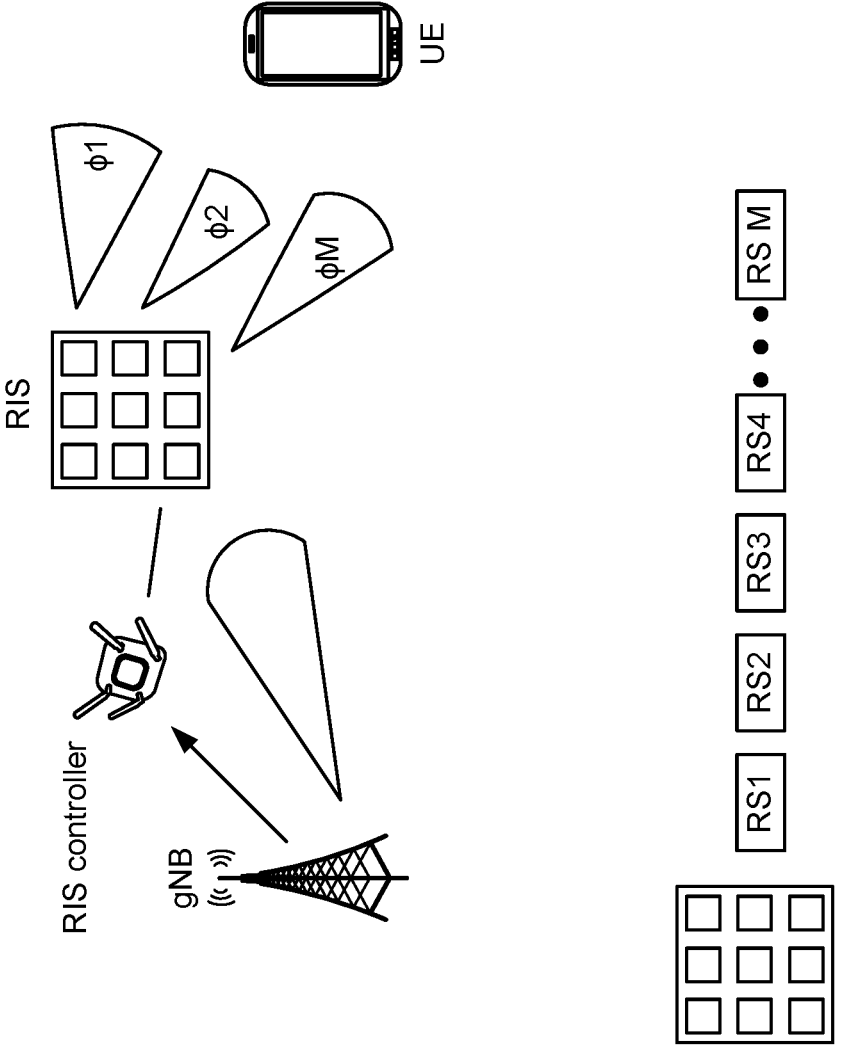
FIG. 4 is a diagram illustrating an example of a reference signal based precoder selection, in accordance with the present disclosure.

FIG. 4 is a diagram illustrating an example 400 of a reference signal based precoder selection, in accordance with the present disclosure.

A base station may transmit multiple reference signals (e.g., RS1, RS2, . . . RSM) in a downlink to an RIS. Each reference signal may be associated with a phase and a reference signal occasion. The multiple reference signals may be associated with M reference signal occasions. The RIS may use a different precoder (e.g., a codebook or a non-codebook precoder) and/or phase for each reference signal associated with each reference signal occasion. The multiple reference signals may be reflected from the RIS and received at a UE. The multiple reference signals may be reflected toward multiple directions (e.g., $\phi1, \phi2, . . . \phi M$). The UE may measure a power level (e.g., an RSRP) associated with each of the multiple reference signals associated with the M reference signal occasions. The UE may identify a reference signal with a highest power level as compared to other reference signals. The UE may transmit, to the controller associated with the RIS and/or the base station, a reference signal index associated with the reference signal with the highest power level. The base station and/or the controller may select a precoder for a reference signal occasion associated with the reference signal with the highest power level. As a result, the base station and/or the controller may be able to determine which precoder is best for serving the UE.

In some cases, the base station may transmit the multiple reference signals to the RIS in the downlink. Alternatively, the UE may transmit multiple reference signals to the RIS in an uplink.

As indicated above, FIG. 4 is provided as an example. Other examples may differ from what is described with regard to FIG. 4.

In some cases, a reflected waveform from an RIS may interfere with a UE that is not being served by a base station, or the reflected waveform may interfere with the UE at times when the RIS is helping a specific set of UEs. The UE that is subjected to interference due to the reflected waveform may be referred to as a victim UE. While an RIS is being trained (e.g., during a reference signal based precoder selection process) to help one or more other UEs, interference reporting by the victim UE may reduce an impact of the interference from the RIS to the victim UE while the RIS is serving the one or more other UEs.

Figure 5:
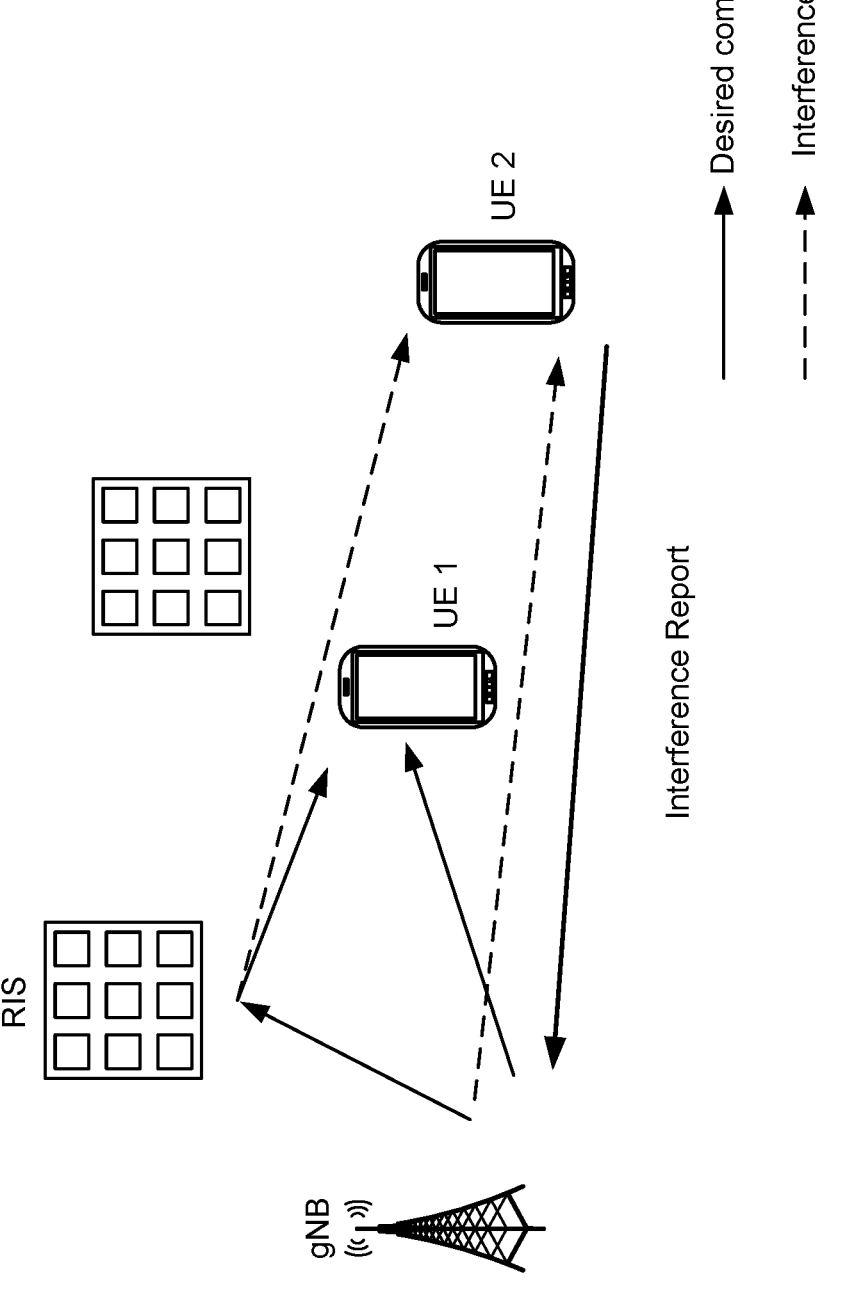
FIG. 5 is a diagram illustrating an example of interference caused by an RIS, in accordance with the present disclosure.

FIG. 5 is a diagram illustrating an example 500 of interference caused by an RIS, in accordance with the present disclosure.

A base station may transmit a reference signal to an RIS during a training involving the base station, the RIS, and a first UE. The RIS may reflect the reference signal using one or more elements associated with the RIS, and the reflected reference signal may be received at the first UE. However, the reflected reference signal may also be received at a second UE and cause interference for the second UE, which may be considered to be a victim UE. In this case, the second UE may transmit an interference report to the base station. The interference report may help reduce an impact of interference from the RIS to the second UE.

As indicated above. FIG. 5 is provided as an example. Other examples may differ from what is described with regard to FIG. 5.

An RIS beam training may involve a base station, an RIS, and a serving UE (e.g., a UE that is served by the base station). During the RIS beam training, a victim UE that is subjected to interference may measure reflected reference signals and prepare an interference report based at least in part on measurements associated with the reflected reference signals. In some cases, reference signals may be assumed to be associated with channel state information interference management (CSI-IM) resources for the victim UE that is subjected to the interference, where the CSI-IM resources may be configured by the base station.

In other cases, the serving UE (or base station) may train the RIS for the purpose of transmitting an uplink signal to the base station or a sidelink UE. During the RIS beam training, interference from the RIS on victim UEs may be measured by the victim UEs. The victim UEs may be potentially scheduled at a same time as serving UEs and/or the RIS. The interference measured by the victim UEs may be indicated to the base station via interference reporting, which may allow the base station to mitigate using certain beams and/or adjust an MCS of transmissions to reduce an impact of the interference on the victim UEs. The interference reporting may enable the base station to select a suitable codebook given interference levels at the victim UEs.

A base station may transmit training DCI to an RIS controller. The training DCI may be referred to as an RIS beam training DCI. The base station may transmit the training DCI to configure the RIS controller with K training occasions to beam train an RIS associated with the RIS controller to help serving UEs in an uplink or in a downlink. At a same time, interference caused by reflected signals from the RIS may be harmful to victim UEs that are not being served by the base station. The base station may transmit a request, to the victim UEs that are not being served by the base station, to transmit interference reports over certain physical uplink control channel (PUCCH) resources to the base station. Alternatively, the interference reports may be transmitted between victim UEs over sidelink resources, and then transmitted to the base station. As a result, the K training occasions may be considered as CSI-IM resources to the victim UEs for measuring the interference.

During an RIS beam training, a base station may transmit multiple reference signals to an RIS, which may reflect the multiple reference signals toward a serving UE. The serving UE may perform measurements for each of the multiple reference signals and indicate, to an RIS controller associated with the RIS and/or the base station a reference signal index corresponding to a best reference signal (e.g., a reference signal received with a highest power as compared to other reference signals). However, during the RIS beam training, the multiple reference signals reflected from the RIS may cause interference to a victim UE that is not served by the base station.

In various aspects of techniques and apparatuses described herein, a base station may transmit DCI associated with an RIS beam training to an RIS controller and one or more UEs. The RIS controller and the one or more UEs may be configured for the RIS beam training based at least in part on the DCI. The DCI may indicate serving UE identifiers and victim UE identifiers, which may enable the RIS controller to set beams that are suitable for serving UEs and restrict usage of beams that are not suitable for victim UEs. The DCI may indicate PUCCH resource identifiers for the serving UEs and the victim UEs, which may enable the serving UEs to transmit beam information reports to the base station and enable the victim UEs to transmit interference reports to the base station. As a result, contents of the DCI may enable the base station to select suitable beams for the serving UEs and the victim UEs given interference levels at the victim UEs.

FIG. 6 is a diagram illustrating an example 600 of DCI for RIS beam training, in accordance with the present disclosure. As shown in FIG. 6, example 600 includes communication between a UE (e.g., UE 120), a base station (e.g., base station 110), and an RIS controller (e.g., RIS controller 122). In some aspects, the UE, the base station, and the RIS controller may be included in a wireless network, such as wireless network 100.

As shown by reference number 602, the UE may receive, from the base station. DCI associated with an RIS beam training. The UE may receive the DCI from the base station via an RIS associated with the RIS controller. The DCI may configure the UE and the RIS controller for the RIS beam training. In some aspects, the RIS may include a plurality of elements that reflect signals received from the base station toward one or more directions associated with the UE.

In some aspects, the UE may be a serving UE that is served by the base station. In some aspects, the UE may be a victim UE that is subjected to interference from reference signals reflected from the RIS associated with the RIS controller during the RIS beam training. In other words, the UE may be part of a set of serving UEs or a set of victim UEs.

In some aspects, the DCI may be a group common RIS training DCI for configuring the RIS controller and the UE for the RIS beam training. The DCI may indicate serving UE identifiers, victim UE identifiers, PUCCH resource identifiers for serving UEs and PUCCH resource identifiers for victim UEs, a quantity of beams to be reported by the serving UEs, and/or a quantity of interference metrics to be reported by the victim UEs. The beams may be "best beams", or beams associated with power levels that satisfy a threshold. In some aspects, the UE may receive, from the base station, radio resource control (RRC) signaling or a medium access control control element (MAC-CE) that configures initial values associated with the quantity of beams and the quantity of interference metrics.

In some aspects, the DCI may include a first DCI and a second DCI. The first DCI may be a group common RIS training DCI for the RIS controller, and the UE and the second DCI may be specific to the UE. The first DCI may indicate serving UE identifiers, victim UE identifiers, and/or a time and frequency resource allocation associated with the second DCI. The second DCI may indicate victim UE identifiers. PUCCH resource identifiers for serving UEs and uplink control channel resource identifiers for victim UEs, a quantity of beams to be reported by the serving UEs, and/or a quantity of interference metrics to be reported by the victim UEs.

In some aspects, the base station may transmit the DCI to the RIS controller, which may forward the DCI to the UE. The DCI may be the group common RIS beam training DCI, as the DCI may be decoded by the RIS controller and the UE (including serving UEs and victim UEs). The base station may transmit the DCI to the RIS controller in order to configure the RIS controller and the UE for an RIS beam training. During the RIS beam training, reference signals may be transmitted to the UE (e.g., one of the serving UEs), and the UE may indicate a reference signal index associated with one of the reference signals. During the RIS beam training, the base station and/or RIS controller may select a beam based at least in part on the reference signal index.

In some aspects, the DCI may indicate serving UE identifiers. In other words, the DCI may indicate identifiers associated with the serving UEs. The RIS controller may use the serving UE identifiers to set beams for the serving UEs. In some aspects, the RIS controller may use the serving UE identifiers to set the beams based at least in part on historical beams used to serve those serving UEs. In other words, the RIS controller may identify, based at least in part on the serving UE identifiers, the historical beams used to serve the serving UEs associated with those serving UE identifiers. In some aspects, the RIS controller may set the beams for the serving UEs based at least in part on a positioning associated with the serving UEs.

In some aspects, the DCI may indicate victim UE identifiers. In other words, the DCI may indicate identifiers associated with the victim UEs. The RIS controller may use the victim UE identifiers to mitigate using certain beams or restrict using certain beams in directions associated with the victim UEs. In other words, the RIS controller may identify, based at least in part on the victim UE identifiers, historical beams that caused interference to the victim UEs associated with those victim UE identifiers, and the RIS controller may avoid using those beams in the directions associated with the victim UEs.

In some aspects, the DCI may indicate PUCCH resource identifiers for the serving UEs and/or PUCCH resource identifiers for the victim UEs. The PUCCH resource identifiers for the serving UEs may be associated with PUCCH resources for the serving UEs, where the PUCCH resources may be used by the serving UEs for transmitting feedback in an uplink indicating beam information. The PUCCH resource identifiers for the victim UEs may be associated with PUCCH resources for the victim UEs, where the PUCCH resources may be used by the victim UEs for transmitting interference reports to the base station in an uplink.

In some aspects, the DCI may indicate a quantity of beams to be reported by the serving UEs. In some aspects, the DCI transmitted to the RIS controller may indicate a quantity of interference metrics as well as reference signal time indices (e.g., beam training occasion indexes) to be reported by the victim UEs to the base station. The interference metrics may correspond to interference powers. RSRPs, RSRQ, signal to interference and noise ratios (SINRs), and/or MCSs, which may be associated with reference signals that cause interference to the victim UEs. In some aspects, the quantity of the beams and the quantity of the interference metrics may be configured initially via RRC signaling or a MAC-CE.

In some aspects, the base station may transmit two separate DCIs to the RIS controller. A first DCI may be a first RIS beam training DCI, and a second DCI may be a second RIS beam training DCI. The first DCI may indicate information regarding the RIS, which may be used by involved nodes (e.g., all involved nodes). The first DCI may be a common DCI between the RIS controller and the UE. In other words, the base station may transmit the first DCI to the RIS controller, and the RIS controller may forward the first DCI to the UE. The second DCI may indicate information that is only to be used by the UE (e.g., a victim UE or a serving UE). The base station may transmit the second DCI to the RIS controller, and the RIS controller may forward the second DCI to the UE without decoding the second DCI.

In some aspects, the first DCI may indicate the serving UE identifiers, which may be used by the RIS controller to set the beams for the serving UEs. In some aspects, the first DCI may indicate victim UE identifiers, which may be used by the RIS controller to mitigate using certain beams or restrict using certain beams in directions associated with the victim UEs. In some aspects, the first DCI may indicate a time and frequency resource allocation associated with the second DCI, which may save searching by the UEs.

In some aspects, the second DCI may indicate PUCCH resource identifiers for the serving UEs and/or PUCCH resource identifiers for the victim UEs. In some aspects, the second DCI may indicate a quantity of beams to be reported by the serving UEs, and/or a quantity of interference metrics (e.g., interference powers. RSRPs, RSRQ, SINRs, and/or MCSs) as well as reference signal time indices (e.g., beam training occasion indexes) to be reported by the victim UEs to the base station.

In some aspects, the victim UE identifiers may be indicated in the second DCI instead of the first DCI. In some cases, the RIS controller may not leverage victim UE identifier information by design. In these cases, the RIS controller may not change beams according to the victim UE identifiers and may instead change the beams based at least in part on the serving UE identifiers.

In some aspects. DCI for RIS beam training may be based at least in part on a feature that is enabled for disabled. For example, when the feature is enabled, the DCI may be split into two separate DCIs. The two separate DCIs may include the first DCI and the second DCI. Alternatively, when the feature is disabled, the DCI may be a single DCI.

In some aspects, DCI (e.g., a group common DCI) may indicate a bitmap for the UE. The bitmap may indicate certain beam training occasions that the UE should include or exclude in reporting to the base station. In some aspects, a victim UE may monitor certain beam training occasions based at least in part on the bitmap, and the victim UE may indicate interference associated with those certain beam training occasions in the interference reporting. The DCI may indicate the bitmap for each victim UE to include/ monitor or exclude certain beam training occasions when reporting an interference report to a base station. In some aspects, a serving UE may only perform measurements for beam training occasions indicated in a bitmap associated with the serving UE. The bitmap may reduce a payload size for feedback for the serving UE. The base station may use bitmaps to restrict certain beams to certain serving UEs. As a result, different beams may be used across the serving UEs.

As an example, for four beam training occasions, a serving UE may measure various signal power metrics such as an RSRP, RSRQ, and/or SINR for all four beam training occasions. The serving UE may transmit, to a base station, an index of L<4 beams associated with a highest signal power metric. The base station may select a precoder based at least in part on the index received from the serving UE. A first victim UE may receive, from the base station and via an RIS controller, DCI that indicates a bitmap of "1100". In this case, the first victim UE may monitor the first and second beam training occasions, but not the third and fourth beam training occasions. The first victim UE may transmit an interference report to the base station that accounts for the first and second beam training occasions but not the third and fourth beam training occasions. A second victim UE may receive, from the base station and via the RIS controller, DCI that indicates a bitmap of "0011". In this case, the second victim UE may monitor the third and fourth beam training occasions, but not the first and second beam training occasions. The second victim UE may transmit an interference report to the base station that accounts for the third and fourth beam training occasions but not the first and second beam training occasions.

In some aspects, configuring different bitmaps for different UEs may reduce an overhead associated with monitoring and may reduce a report size for each UE. In some aspects, the base station may receive reports from multiple UEs (e.g., serving UEs and/or victim UEs), and the base station may interpolate beams from the reports received from each of the multiple UEs.

As shown by reference number 604, the RIS controller may configure one or more beams for the UE based at least in part on the DCI associated with the RIS beam training. In some aspects, the RIS controller may set the one or more beams based at least in part on historical beams used to serve the serving UEs associated with the serving UE identifiers. In some aspects, the RIS controller may set the one or more beams based at least in part on a positioning associated with the serving UEs. In some aspects, the RIS controller may restrict use of the one or more beams in directions associated with the victim UEs based at least in part on historical beams that caused interference for the victim UEs, where the historical beams may be identified based at least in part on the victim UE identifiers. In other words, the RIS controller may configure the one or more beams based at least in part on the DCI received from the base station, where the DCI may indicate the serving UE identifiers and the victim UE identifiers.

As shown by reference number 606, the UE may transmit a report to the base station based at least in part on the DCI associated with the RIS beam training. In some aspects, the report may indicate an index associated with a beam training occasion that corresponds to a highest power metric as compared to other beam training occasions when the UE is a serving UE. In some aspects, the report may be an interference report when the UE is a victim UE. In some aspects, the interference report may indicate an interference power, an eigenvalue, and/or a rank of interference.

In some aspects, the UE may receive, from the base station, an additional DCI with a request for the UE (e.g., a victim UE) to transmit the interference report to the base station. The additional DCI may indicate one or more beam training occasions for which interference metrics are to be indicated in the interference report. The additional DCI may indicate PUCCH resources for transmitting the interference report from the UE to the base station. In some aspects, the interference metrics may include an RSRP, an RSRQ, an SINR, or an MCS associated with the one or more beam training occasions.

In some aspects, the UE (e.g., a non-victim UE) may receive, from the base station, an additional DCI with a request for the UE to transmit a measurement report to the base station. The additional DCI may indicate PUCCH resources for transmitting the additional DCI from the UE to the base station. The measurement report may indicate an RSRP, an RSRQ, an SINR, an MCS, and/or a CQI.

In some aspects, the base station may transmit a request to the UE (e.g., a victim UE) to send an interference report to the base station. The request may instruct the UE to indicate, in the interference report, an interference power, RSRP. RSRQ, SINR, and/or MCS of a certain/specific beam training index. The certain/specific beam training index may correspond to a certain beam/configuration at the RIS. As a result, the base station may be able to determine interference experienced by the victim UEs at specific beams used by the RIS during RIS beam training.

As an example, the base station may transmit an additional DCI to victim UEs. The additional DCI may include a bitmap that indicates certain beam training occasions, and the victim UEs may transmit interference reports for the certain beam training occasions indicated in the bitmap. The additional DCI may indicate PUCCH information that enables the victim UEs to transmit the interference reports.

As shown by reference number 608, the base station may perform interference mitigation based at least in part on information indicated in the interference report. The base station may perform the interference mitigation by adjusting a beamformer, adjusting an RIS selection, adjusting a CQI for the UE (e.g., a victim UE subjected to interference), and/or adjusting data rank. The information indicated in the interference report may indicate measured interference from the RIS. The information indicated in the interference report may also include other types of information, such as the interference power, the eigenvalues, and/or the rank of interference. In some aspects, the base station may configure which victim UEs should transmit interference reports to the base station.

As indicated above, FIG. 6 is provided as an example. Other examples may differ from what is described with regard to FIG. 6.

Figure 7:
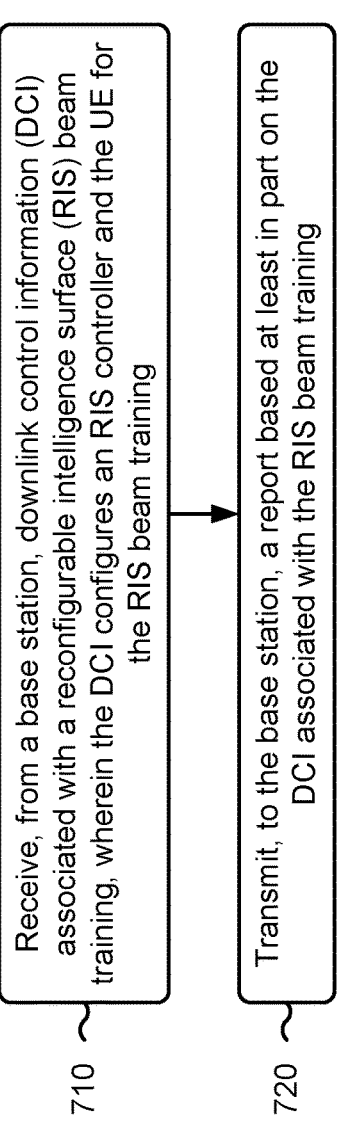

FIG. 7 is a diagram illustrating an example process 700 performed, for example, by a UE, in accordance with the present disclosure. Example process 700 is an example where the UE (e.g., UE 120) performs operations associated with DCI for RIS beam training.

As shown in FIG. 7, in some aspects, process 700 may include receiving, from abase station. DCI associated with an RIS beam training, wherein the DCI configures an RIS controller and the UE for the RIS beam training (block 710). For example, the UE (e.g., using reception component 1002, depicted in FIG. 10) may receive, from a base station, DCI associated with an RIS beam training, wherein the DCI configures an RIS controller and the UE for the RIS beam training, as described above.

As further shown in FIG. 7, in some aspects, process 700 may include transmitting, to the base station, a report based at least in part on the DCI associated with the RIS beam training (block 720). For example, the UE (e.g., using transmission component 1004, depicted in FIG. 10) may transmit, to the base station, a report based at least in part on the DCI associated with the RIS beam training, as described above.

Process 700 may include additional aspects, such as any single aspect or any combination of aspects described below and/or in connection with one or more other processes described elsewhere herein.

In a first aspect, the UE is a serving UE that is served by the base station, or a victim UE that is subjected to inter-ference from reference signals reflected from an RIS asso-ciated with the RIS controller during the RIS beam training.

In a second aspect, alone or in combination with the first aspect, the DCI is a group common RIS training DCI for configuring the RIS controller and the UE for the RIS beam training, wherein the DCI indicates one or more of serving UE identifiers, victim UE identifiers, uplink control channel resource identifiers for serving UEs and uplink control channel resource identifiers for victim UEs, a quantity of beams to be reported by the serving UEs, or a quantity of interference metrics to be reported by the victim UEs.

In a third aspect, alone or in combination with one or more of the first and second aspects, process 700 includes receiv-ing, from the base station. RRC signaling or a MAC-CE that configures initial values associated with the quantity of beams and the quantity of interference metrics.

In a fourth aspect, alone or in combination with one or more of the first through third aspects, the DCI includes a first DCI and a second DCI, wherein the first DCI is a group common RIS training DCI for the RIS controller and the UE and the second DCI is specific to the UE, wherein the first DCI indicates one or more of serving UE identifiers, victim UE identifiers, or a time and frequency resource allocation associated with the second DCI, and the second DCI indi-cates one or more of victim UE identifiers, uplink control channel resource identifiers for serving UEs and uplink control channel resource identifiers for victim UEs, a quan-tity of beams to be reported by the serving UEs, or a quantity of interference metrics to be reported by the victim UEs.

In a fifth aspect, alone or in combination with one or more of the first through fourth aspects, the DCI indicates a bitmap for the UE, wherein the bitmap indicates one or more beam training occasions for the UE to monitor and indicate in the report, or wherein the bitmap indicates one or more beam training occasions for the UE to exclude from the report.

In a sixth aspect, alone or in combination with one or more of the first through fifth aspects, the report indicates an index associated with a beam training occasion that corresponds to a highest power metric as compared to other beam training occasions, and the UE is a serving UE.

In a seventh aspect, alone or in combination with one or more of the first through sixth aspects, the report is an interference report and the UE is a victim UE.

In an eighth aspect, alone or in combination with one or more of the first through seventh aspects, the interference report indicates one or more of an interference power, an eigenvalue, or a rank of interference.

In a ninth aspect, alone or in combination with one or more of the first through eighth aspects, process 700 includes receiving, from the base station, an additional DCI with a request for the victim UE to transmit the interference report to the base station, wherein the additional DCI indicates one or more beam training occasions for which interference metrics are to be indicated in the interference report, and the additional DCI indicates uplink control channel resources for transmitting the interference report from the victim UE to the base station.

In a tenth aspect, alone or in combination with one or more of the first through ninth aspects, the interference metrics include one or more of an RSRP, an RSRQ, an SINR, or an MCS associated with the one or more beam training occasions.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a base station, in accordance with the present disclosure. Example process 800 is an example where the base station (e.g., base station 110) performs operations associated with DCI for RIS beam training.

As shown in FIG. 8, in some aspects, process 800 may include transmitting, to an RIS controller and one or more UEs, DCI associated with an RIS beam training, wherein the RIS controller and the one or more UEs are configured for the RIS beam training based at least in part on the DCI (block 810). For example, the base station (e.g., using communication manager 150 and/or transmission compo-nent 1104, depicted in FIG. 11) may transmit, to an RIS controller and one or more UEs, DCI associated with an RIS beam training, wherein the RIS controller and the one or more UEs are configured for the RIS beam training based at least in part on the DCI, as described above.

As further shown in FIG. 8, in some aspects, process 800 may include receiving, from the one or more UEs, a report based at least in part on the DCI associated with the RIS beam training (block 820). For example, the base station (e.g., using communication manager 150 and/or reception component 1102, depicted in FIG. 11) may receive, from the one or more UEs, a report based at least in part on the DCI associated with the RIS beam training, as described above.

Process 800 may include additional aspects, such as any single aspect or any combination of aspects described below and/or in connection with one or more other processes described elsewhere herein.

In a first aspect, the one or more UEs include serving UEs that are served by the base station, and victim UEs that are subjected to interference from reference signals reflected from an RIS associated with the RIS controller during the RIS beam training.

In a second aspect, alone or in combination with the first aspect, the DCI is a group common RIS training DCI for configuring the RIS controller and the one or more UEs for the RIS beam training, wherein the DCI indicates one or more of serving UE identifiers, victim UE identifiers, uplink control channel resource identifiers for serving UEs and uplink control channel resource identifiers for victim UEs, a quantity of beams to be reported by the serving UEs. or a quantity of interference metrics to be reported by the victim UEs.

In a third aspect, alone or in combination with one or more of the first and second aspects, process 800 includes transmitting, to the one or more UEs. RRC signaling or a MAC-CE that configures initial values associated with the quantity of beams and the quantity of interference metrics.

In a fourth aspect, alone or in combination with one or more of the first through third aspects, the DCI includes a first DCI and a second DCI, wherein the first DCI is a group common RIS training DCI for the RIS controller and the one or more UEs and the second DCI is specific to the one or more UEs, wherein the first DCI indicates one or more of serving UE identifiers, victim UE identifiers, or a time and frequency resource allocation associated with the second DCI, and the second DCI indicates one or more of victim UE identifiers, uplink control channel resource identifiers for serving UEs and uplink control channel resource identifiers for victim UEs, a quantity of beams to be reported by the serving UEs, or a quantity of interference metrics to be reported by the victim UEs.

In a fifth aspect, alone or in combination with one or more of the first through fourth aspects, the DCI indicates a bitmap for each UE of the one or more UEs, wherein the bitmap indicates one or more beam training occasions for the UE to monitor and indicate in the report, or wherein the bitmap indicates one or more beam training occasions for the UE to exclude from the report.

In a sixth aspect, alone or in combination with one or more of the first through fifth aspects, the report indicates an index associated with a beam training occasion that corresponds to a highest power metric as compared to other beam training occasions, and the UE is a serving UE.

In a seventh aspect, alone or in combination with one or more of the first through sixth aspects, the report is an interference report and the UE is a victim UE.

In an eighth aspect, alone or in combination with one or more of the first through seventh aspects, the interference report indicates one or more of an interference power, an eigenvalue, or a rank of interference.

In a ninth aspect, alone or in combination with one or more of the first through eighth aspects, process 800 includes performing an interference mitigation for the victim UE based at least in part on the interference report, wherein the interference mitigation includes one or more of adjusting a beamformer, adjusting an RIS selection, adjusting a channel quality indicator for the victim UE, or adjusting a data rank.

In a tenth aspect, alone or in combination with one or more of the first through ninth aspects, process 800 includes transmitting, to the victim UE, an additional DCI with a request for the victim UE to transmit the interference report to the base station, wherein the additional DCI indicates one or more beam training occasions for which interference metrics are to be indicated in the interference report, and the additional DCI indicates uplink control channel resources for transmitting the interference report from the victim UE to the base station: or transmitting, to a non-victim UE, an additional DCI with a request for the non-victim UE to transmit a measurement report to the base station, wherein the additional DCI indicates uplink control channel resources for transmitting the additional DCI from the non-victim UE to the base station.

In an eleventh aspect, alone or in combination with one or more of the first through tenth aspects, the interference metrics include one or more of an RSRP, an RSRQ, an SINR, or an MCS associated with the one or more beam training occasions.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
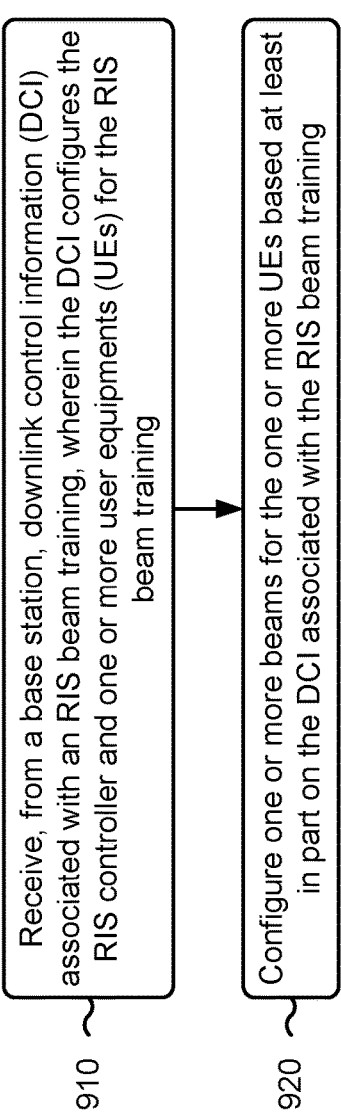

FIG. 9 is a diagram illustrating an example process 900 performed, for example, by an RIS controller (e.g., RIS controller 122), in accordance with the present disclosure. Example process 900 is an example where the RIS controller performs operations associated with DCI for RIS beam training.

As shown in FIG. 9, in some aspects, process 900 may include receiving, from abase station, DCI associated with an RIS beam training, wherein the DCI configures the RIS controller and one or more UEs for the RIS beam training (block 910). For example, the RIS (e.g., using reception component 1202, depicted in FIG. 12) may receive, from a base station, DCI associated with an RIS beam training, wherein the DCI configures the RIS controller and one or more UEs for the RIS beam training, as described above.

As further shown in FIG. 9, in some aspects, process 900 may include configuring one or more beams for the one or more UEs based at least in part on the DCI associated with the RIS beam training (block 920). For example, the RIS (e.g., using configuration component 1208, depicted in FIG. 12) may configure one or more beams for the one or more UEs based at least in part on the DCI associated with the RIS beam training, as described above.

Process 900 may include additional aspects, such as any single aspect or any combination of aspects described below and/or in connection with one or more other processes described elsewhere herein.

In a first aspect, the one or more UEs include serving UEs that are served by the base station, and victim UEs that are subjected to interference from reference signals reflected from an RIS associated with the RIS controller during the RIS beam training.

In a second aspect, alone or in combination with the first aspect, the DCI is a group common RIS training DCI for configuring the RIS controller and the UE for the RIS beam training, wherein the DCI indicates one or more of serving UE identifiers, victim UE identifiers, uplink control channel resource identifiers for serving UEs and uplink control channel resource identifiers for victim UEs, a quantity of beams to be reported by the serving UEs, or a quantity of interference metrics to be reported by the victim UEs.

In a third aspect, alone or in combination with one or more of the first and second aspects, process 900 includes setting the one or more beams based at least in part on historical beams used to serve the serving UEs associated with the serving UE identifiers, or setting the one or more beams based at least in part on a positioning associated with the serving UEs.

In a fourth aspect, alone or in combination with one or more of the first through third aspects, process 900 includes restricting use of the one or more beams in directions associated with the victim UEs based at least in part on historical beams that caused interference for the victim UEs, wherein the historical beams are identified based at least in part on the victim UE identifiers.

In a fifth aspect, alone or in combination with one or more of the first through fourth aspects, the DCI includes a first DCI and a second DCI, wherein the first DCI is a group common RIS training DCI for the RIS controller and the one or more UEs and the second DCI is specific to the one or more UEs, wherein the first DCI indicates one or more of serving UE identifiers, victim UE identifiers, or a time and frequency resource allocation associated with the second DCI, and the second DCI indicates one or more of victim UE identifiers, uplink control channel resource identifiers for serving UEs and uplink control channel resource identifiers for victim UEs, a quantity of beams to be reported by the serving UEs, or a quantity of interference metrics to be reported by the victim UEs.

In a sixth aspect, alone or in combination with one or more of the first through fifth aspects, the RIS controller is associated with an RIS, wherein the RIS includes a plurality of elements that reflect signals received from the base station toward one or more directions associated with the one or more UEs.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
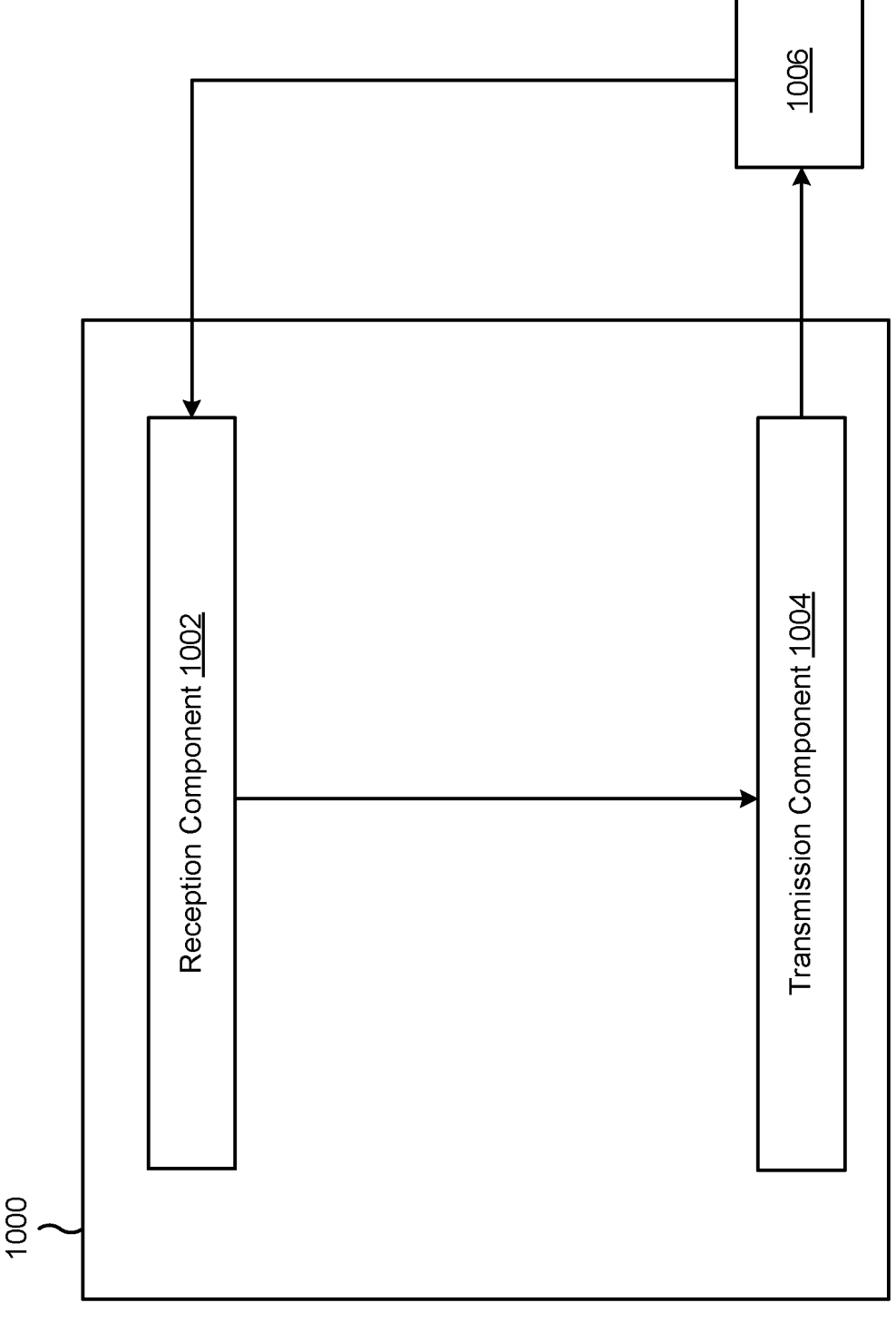
FIGS. 10-12 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004.

In some aspects, the apparatus 1000 may be configured to perform one or more operations described herein in connection with FIG. 6. Additionally, or alternatively, the apparatus 1000 may be configured to perform one or more processes described herein, such as process 700 of FIG. 7. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive, from a base station, DCI associated with an RIS beam training, wherein the DCI configures an RIS controller and the UE for the RIS beam training. The transmission component 1004 may transmit, to the base station, a report based at least in part on the DCI associated with the RIS beam training.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
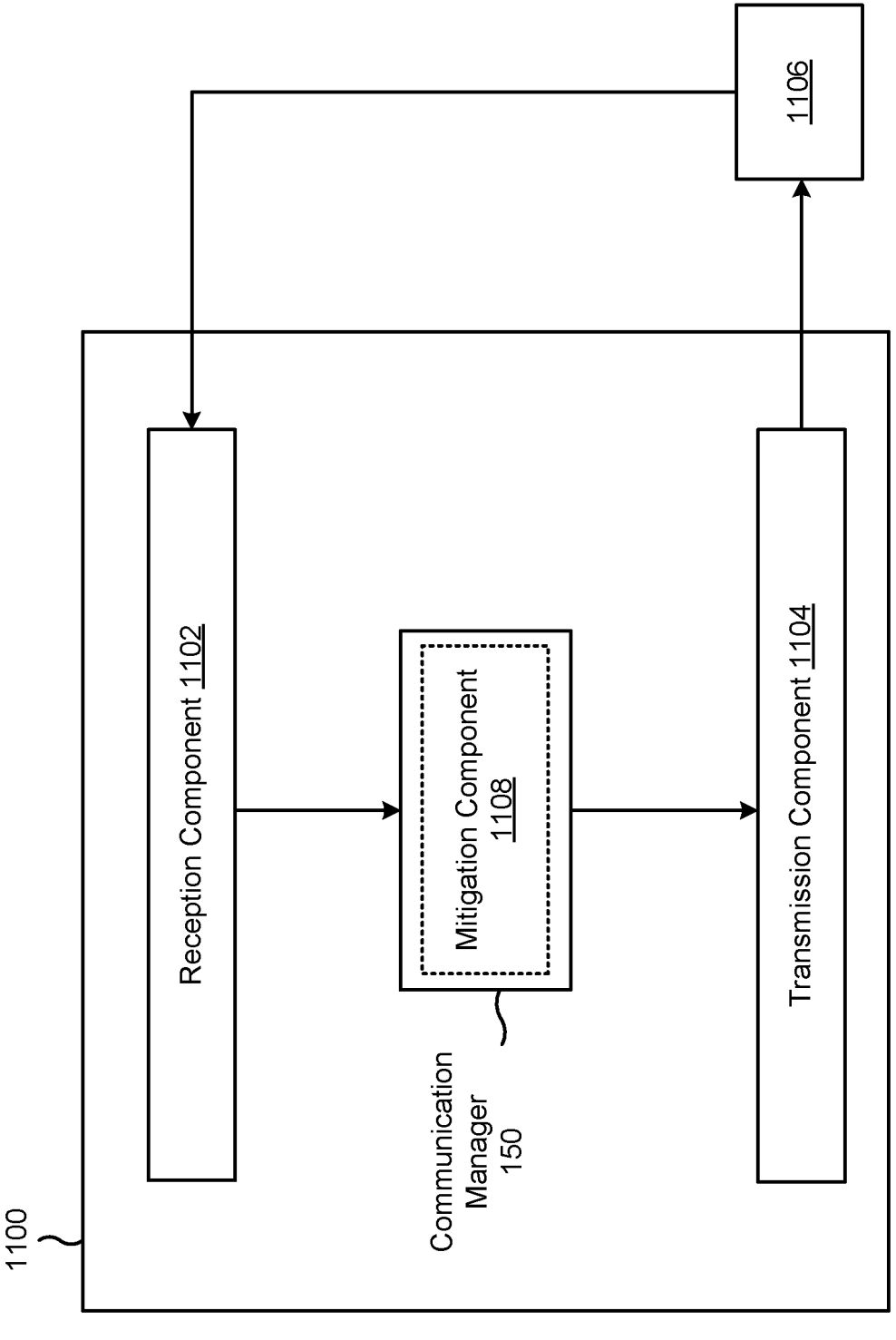

FIG. 11 is a diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a mitigation component 1108, among other examples.

In some aspects, the apparatus 1100 may be configured to perform one or more operations described herein in connection with FIG. 6. Additionally, or alternatively, the apparatus 1100 may be configured to perform one or more processes described herein, such as process 800 of FIG. 8. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1100. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The transmission component 1104 may transmit, to an RIS controller and one or more UEs, DCI associated with an RIS beam training, wherein the RIS controller and the one or more UEs are configured for the RIS beam training based at least in part on the DCI. The reception component 1102 may receive, from the one or more UEs, a report based at least in part on the DCI associated with the RIS beam training.

The mitigation component 1108 may perform an interference mitigation for the victim UE based at least in part on the interference report, wherein the interference mitigation includes one or more of: adjusting a beamformer, adjusting an RIS selection, adjusting a channel quality indicator for the victim UE, or adjusting a data rank.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
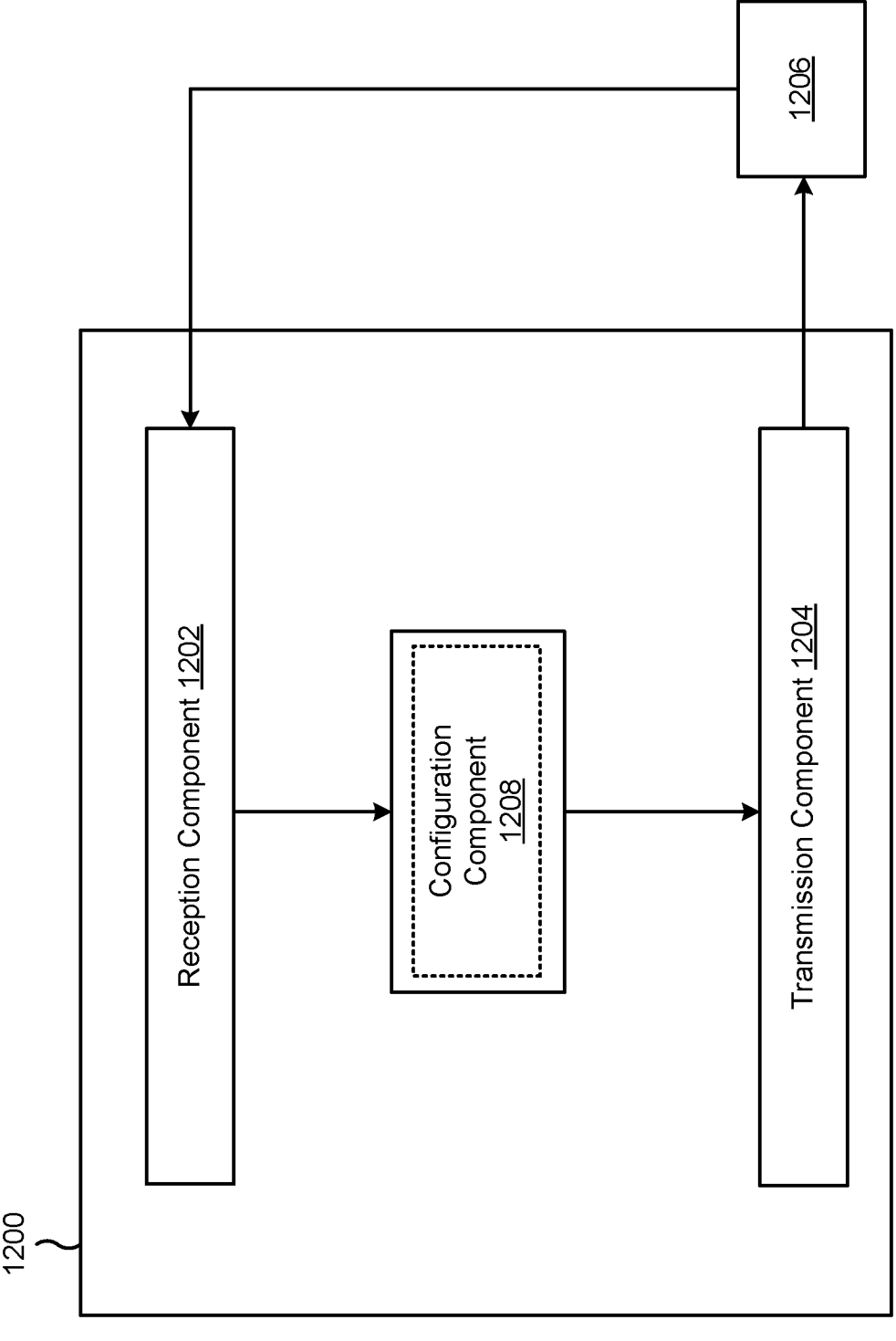

FIG. 12 is a diagram of an example apparatus 1200 for wireless communication. The apparatus 1200 may be an RIS controller, or an RIS controller may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. The RIS controller may include a configuration component 1208, among other examples.

In some aspects, the apparatus 1200 may be configured to perform one or more operations described herein in connection with FIG. 6. Additionally, or alternatively, the apparatus 1200 may be configured to perform one or more processes described herein, such as process 900 of FIG. 9. In some aspects, the apparatus 1200 and/or one or more components shown in FIG. 12 may include one or more components of the RIS controller described in connection with FIG. 2. Additionally. or alternatively, one or more components shown in FIG. 12 may be implemented within one or more components described in connection with FIG. 2. Additionally. or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a modem, a demodulator, a MIMO detector, a receive processor, a controller/processor, a memory, or a combination thereof, of the RIS controller described in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the RIS controller described in connection with FIG. 2. In some aspects, the transmission component 1204 may be co-located with the reception component 1202 in a transceiver.

The reception component 1202 may receive, from a base station, DCI associated with an RIS beam training, wherein the DCI configures the RIS controller and one or more UEs for the RIS beam training. The configuration component 1208 may configure one or more beams for the one or more UEs based at least in part on the DCI associated with the RIS beam training. The configuration component 1208 may set the one or more beams based at least in part on historical beams used to serve serving UEs associated with serving UE identifiers. The configuration component 1208 may set the one or more beams based at least in part on a positioning associated with the serving UEs. The configuration component 1208 may restrict use of the one or more beams in directions associated with victim UEs based at least in part on historical beams that caused interference for the victim UEs, wherein the historical beams are identified based at least in part on victim UE identifiers.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving, from a base station, downlink control information (DCI) associated with a reconfigurable intelligence surface (RIS) beam training, wherein the DCI configures an RIS controller and the UE for the RIS beam training; and transmitting, to the base station, a report based at least in part on the DCI associated with the RIS beam training.

Aspect 2: The method of Aspect 1, wherein the UE is: a serving UE that is served by the base station: or a victim UE that is subjected to interference from reference signals reflected from an RIS associated with the RIS controller during the RIS beam training.

Aspect 3: The method of any of Aspects 1 through 2, wherein the DCI is a group common RIS training DCI for configuring the RIS controller and the UE for the RIS beam training, and wherein the DCI indicates one or more of: serving UE identifiers, victim UE identifiers, uplink control channel resource identifiers for serving UEs and uplink control channel resource identifiers for victim UEs, a quantity of beams to be reported by the serving UEs, or a quantity of interference metrics to be reported by the victim UEs.

Aspect 4: The method of Aspect 3, further comprising: receiving, from the base station, radio resource control signaling or a medium access control control element that configures initial values associated with the quantity of beams and the quantity of interference metrics.

Aspect 5: The method of any of Aspects 1 through 4, wherein the DCI includes a first DCI and a second DCI, wherein the first DCI is a group common RIS training DCI for the RIS controller and the UE and the second DCI is specific to the UE, wherein the first DCI indicates one or more of: serving UE identifiers, victim UE identifiers, or a time and frequency resource allocation associated with the second DCI, and wherein the second DCI indicates one or more of: victim UE identifiers, uplink control channel resource identifiers for serving UEs and uplink control channel resource identifiers for victim UEs, a quantity of beams to be reported by the serving UEs, or a quantity of interference metrics to be reported by the victim UEs.

Aspect 6: The method of any of Aspects 1 through 5, wherein the DCI indicates a bitmap for the UE, wherein the bitmap indicates one or more beam training occasions for the UE to monitor and indicate in the report, or wherein the bitmap indicates one or more beam training occasions for the UE to exclude from the report.

Aspect 7: The method of any of Aspects 1 through 6, wherein the report indicates an index associated with a beam training occasion that corresponds to a highest power metric as compared to other beam training occasions, and wherein the UE is a serving UE.

Aspect 8: The method of any of Aspects 1 through 7, wherein the report is an interference report and the UE is a victim UE.

Aspect 9: The method of Aspect 8, wherein the interference report indicates one or more of: an interference power, an eigenvalue, or a rank of interference.

Aspect 10: The method of Aspect 8, further comprising: receiving, from the base station, an additional DCI with a request for the victim UE to transmit the interference report to the base station, wherein the additional DCI indicates one or more beam training occasions for which interference metrics are to be indicated in the interference report, and wherein the additional DCI indicates uplink control channel resources for transmitting the interference report from the victim UE to the base station.

Aspect 11: The method of Aspect 10, wherein the interference metrics include one or more of a reference signal received power, a reference signal received quality, a signal to interference and noise ratio, or a modulation and coding scheme associated with the one or more beam training occasions.

Aspect 12: A method of wireless communication performed by abase station, comprising: transmitting, to a reconfigurable intelligence surface (RIS) controller and one or more user equipments (UEs), downlink control information (DCI) associated with an RIS beam training, wherein the RIS controller and the one or more UEs are configured for the RIS beam training based at least in part on the DCI; and receiving, from the one or more UEs, a report based at least in part on the DCI associated with the RIS beam training.

Aspect 13: The method of Aspect 12, wherein the one or more UEs include: serving UEs that are served by the base station; and victim UEs that are subjected to interference from reference signals reflected from an RIS associated with the RIS controller during the RIS beam training.

Aspect 14: The method of any of Aspects 12 through 13, wherein the DCI is a group common RIS training DCI for configuring the RIS controller and the one or more UEs for the RIS beam training, wherein the DCI indicates one or more of: serving UE identifiers, victim UE identifiers, uplink control channel resource identifiers for serving UEs and uplink control channel resource identifiers for victim UEs, a quantity of beams to be reported by the serving UEs, or a quantity of interference metrics to be reported by the victim UEs.

Aspect 15: The method of Aspect 14, further comprising: transmitting, to the one or more UEs, radio resource control signaling or a medium access control control element that configures initial values associated with the quantity of beams and the quantity of interference metrics.

Aspect 16: The method of any of Aspects 12 through 15, wherein the DCI includes a first DCI and a second DCI, wherein the first DCI is a group common RIS training DCI for the RIS controller and the one or more UEs and the second DCI is specific to the one or more UEs, wherein the first DCI indicates one or more of: serving UE identifiers, victim UE identifiers, or a time and frequency resource allocation associated with the second DCI, and wherein the second DCI indicates one or more of: victim UE identifiers, uplink control channel resource identifiers for serving UEs and uplink control channel resource identifiers for victim UEs, a quantity of beams to be reported by the serving UEs, or a quantity of interference metrics to be reported by the victim UEs.

Aspect 17: The method of any of Aspects 12 through 16, wherein the DCI indicates a bitmap for each UE of the one or mom UEs, wherein the bitmap indicates one or more beam training occasions for the UE to monitor and indicate in the report, or wherein the bitmap indicates one or more beam training occasions for the UE to exclude from the report.

Aspect 18: The method of any of Aspects 12 through 17, wherein the report indicates an index associated with a beam training occasion that corresponds to a highest power metric as compared to other beam training occasions, and wherein the UE is a serving UE.

Aspect 19: The method of any of Aspects 12 through 18, wherein the report is an interference report and the UE is a victim UE.

Aspect 20: The method of Aspect 19, wherein the interference report indicates one or more of: an interference power, an eigenvalue, or a rank of interference.

Aspect 21: The method of Aspect 19, further comprising: performing an interference mitigation for the victim UE based at least in part on the interference report, wherein the interference mitigation includes one or more of: adjusting a beamformer, adjusting an RIS selection, adjusting a channel quality indicator for the victim UE, or adjusting a data rank.

Aspect 22: The method of Aspect 19, further comprising: transmitting, to the victim UE, an additional DCI with a request for the victim UE to transmit the interference report to the base station, wherein the additional DCI indicates one or more beam training occasions for which interference metrics are to be indicated in the interference report, and wherein the additional DCI indicates uplink control channel resources for transmitting the interference report from the victim UE to the base station: or transmitting, to a non-victim UE, an additional DCI with a request for the non-victim UE to transmit a measurement report to the base station, wherein the additional DCI indicates uplink control channel resources for transmitting the additional DCI from the non-victim UE to the base station.

Aspect 23: The method of Aspect 22, wherein the interference metrics include one or more of a reference signal received power, a reference signal received quality, a signal to interference and noise ratio, or a modulation and coding scheme associated with the one or more beam training occasions.

Aspect 24: A method of wireless communication performed by a reconfigurable intelligence surface (RIS) controller, comprising: receiving, from a base station, downlink control information (DCI) associated with an RIS beam training, wherein the DCI configures the RIS controller and one or more user equipments (UEs) for the RIS beam training; and configuring one or more beams for the one or more UEs based at least in part on the DCI associated with the RIS beam training.

Aspect 25: The method of Aspect 24, wherein the one or more UEs include: serving UEs that are served by the base station; and victim UEs that are subjected to interference from reference signals reflected from an RIS associated with the RIS controller during the RIS beam training.

Aspect 26: The method of any of Aspects 24 through 25, wherein the DCI is a group common RIS training DCI for configuring the RIS controller and the UE for the RIS beam training, and wherein the DCI indicates one or more of: serving UE identifiers, victim UE identifiers, uplink control channel resource identifiers for serving UEs and uplink control channel resource identifiers for victim UEs, a quantity of beams to be reported by the serving UEs, or a quantity of interference metrics to be reported by the victim UEs.

Aspect 27: The method of Aspect 26, wherein configuring the one or more beams comprises: setting the one or more beams based at least in part on historical beams used to serve the serving UEs associated with the serving UE identifiers; or setting the one or more beams based at least in part on a positioning associated with the serving UEs.

Aspect 28: The method of Aspect 26, wherein configuring the one or more beams comprises: restricting use of the one or more beams in directions associated with the victim UEs based at least in part on historical beams that caused interference for the victim UEs, wherein the historical beams are identified based at least in part on the victim UE identifiers.

Aspect 29: The method of any of Aspects 24 through 28, wherein the DCI includes a first DCI and a second DCI, wherein the first DCI is a group common RIS training DCI for the RIS controller and the one or more UEs and the second DCI is specific to the one or more UEs, wherein the first DCI indicates one or more of: serving UE identifiers, victim UE identifiers, or a time and frequency resource allocation associated with the second DCI, and wherein the second DCI indicates one or more of: victim UE identifiers, uplink control channel resource identifiers for serving UEs and uplink control channel resource identifiers for victim UEs, a quantity of beams to be reported by the serving UEs, or a quantity of interference metrics to be reported by the victim UEs.

Aspect 30: The method of any of Aspects 24 through 29, wherein the RIS controller is associated with an RIS, wherein the RIS includes a plurality of elements that reflect signals received from the base station toward one or more directions associated with the one or more UEs.

Aspect 31: An apparatus for wireless communication at a device, comprising a processor, memory coupled with the processor, and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
  one or more memories; and
  one or more processors, coupled to the one or more memories, configured to:
    receive, from a network entity, downlink control information (DCI) associated with a reconfigurable intelligence surface (RIS) beam training, wherein the DCI is a same DCI that configures both an RIS controller and the UE for the RIS beam training; and
    transmit, to the network entity, a report based at least in part on the DCI associated with the RIS beam training.

2. The apparatus of claim 1, wherein the UE is:
  a serving UE that is served by the network entity; or
  a victim UE that is subjected to interference from reference signals reflected from an RIS associated with the RIS controller during the RIS beam training.

3. The apparatus of claim 1, wherein the DCI is a group common RIS training DCI for configuring the RIS controller and the UE for the RIS beam training, and wherein the DCI indicates one or more of: serving UE identifiers, victim UE identifiers, uplink control channel resource identifiers for serving UEs and uplink control channel resource identifiers for victim UEs, a quantity of beams to be reported by the serving UEs, or a quantity of interference metrics to be reported by the victim UEs.

4. The apparatus of claim 3, wherein the one or more processors are further configured to:
  receive, from the network entity, radio resource control signaling or a medium access control control element that configures initial values associated with the quantity of beams and the quantity of interference metrics.

5. The apparatus of claim 1, wherein the DCI includes a first DCI and a second DCI, wherein the first DCI is a group common RIS training DCI for the RIS controller and the UE and the second DCI is specific to the UE, wherein the first DCI indicates one or more of: serving UE identifiers, victim UE identifiers, or a time and frequency resource allocation associated with the second DCI, and wherein the second DCI indicates one or more of: victim UE identifiers, uplink control channel resource identifiers for serving UEs and uplink control channel resource identifiers for victim UEs, a quantity of beams to be reported by the serving UEs, or a quantity of interference metrics to be reported by the victim UEs.

6. The apparatus of claim 1, wherein the DCI indicates a bitmap for the UE, wherein the bitmap indicates one or more beam training occasions for the UE to monitor and indicate in the report, or wherein the bitmap indicates one or more beam training occasions for the UE to exclude from the report.

7. The apparatus of claim 1, wherein the report indicates an index associated with a beam training occasion that corresponds to a highest power metric as compared to other beam training occasions, and wherein the UE is a serving UE.

8. The apparatus of claim 1, wherein the report is an interference report and the UE is a victim UE.

9. The apparatus of claim 8, wherein the interference report indicates one or more of: an interference power, an eigenvalue, or a rank of interference.

10. The apparatus of claim 8, wherein the one or more processors are further configured to:
receive, from the network entity, an additional DCI with a request for the victim UE to transmit the interference report to the network entity, wherein the additional DCI indicates one or more beam training occasions for which interference metrics are to be indicated in the interference report, and wherein the additional DCI indicates uplink control channel resources for transmitting the interference report from the victim UE to the network entity.

11. The apparatus of claim 10, wherein the interference metrics include one or more of a reference signal received power, a reference signal received quality, a signal to interference and noise ratio, or a modulation and coding scheme associated with the one or more beam training occasions.

12. An apparatus for wireless communication at a network entity, comprising:
one or more memories; and
one or more processors, coupled to the one or more memories, configured to:
transmit, to a reconfigurable intelligence surface (RIS) controller and one or more user equipments (UEs), downlink control information (DCI) associated with an RIS beam training, wherein the DCI is a same DCI that configures both the RIS controller and the one or more UEs for the RIS beam training; and
receive, from the one or more UEs, a report based at least in part on the DCI associated with the RIS beam training.

13. The apparatus of claim 12, wherein the one or more UEs include:
serving UEs that are served by the network entity; and
victim UEs that are subjected to interference from reference signals reflected from an RIS associated with the RIS controller during the RIS beam training.

14. The apparatus of claim 12, wherein the DCI is a group common RIS training DCI for configuring the RIS controller and the one or more UEs for the RIS beam training, wherein the DCI indicates one or more of: serving UE identifiers, victim UE identifiers, uplink control channel resource identifiers for serving UEs and uplink control channel resource identifiers for victim UEs, a quantity of beams to be reported by the serving UEs, or a quantity of interference metrics to be reported by the victim UEs.

15. The apparatus of claim 14, wherein the one or more processors are further configured to:
transmit, to the one or more UEs, radio resource control signaling or a medium access control control element that configures initial values associated with the quantity of beams and the quantity of interference metrics.

16. The apparatus of claim 12, wherein the DCI includes a first DCI and a second DCI, wherein the first DCI is a group common RIS training DCI for the RIS controller and the one or more UEs and the second DCI is specific to the one or more UEs, wherein the first DCI indicates one or more of: serving UE identifiers, victim UE identifiers, or a time and frequency resource allocation associated with the second DCI, and wherein the second DCI indicates one or more of: victim UE identifiers, uplink control channel resource identifiers for serving UEs and uplink control channel resource identifiers for victim UEs, a quantity of beams to be reported by the serving UEs, or a quantity of interference metrics to be reported by the victim UEs.

17. The apparatus of claim 12, wherein the DCI indicates a bitmap for each UE of the one or more UEs, wherein the bitmap indicates one or more beam training occasions for the UE to monitor and indicate in the report, or wherein the bitmap indicates one or more beam training occasions for the UE to exclude from the report.

18. The apparatus of claim 12, wherein the report indicates an index associated with a beam training occasion that corresponds to a highest power metric as compared to other beam training occasions, and wherein the UE is a serving UE.

19. The apparatus of claim 12, wherein the report is an interference report and the UE is a victim UE.

20. The apparatus of claim 19, wherein the interference report indicates one or more of: an interference power, an eigenvalue, or a rank of interference.

21. The apparatus of claim 19, wherein the one or more processors are further configured to:
perform an interference mitigation for the victim UE based at least in part on the interference report, wherein the interference mitigation includes one or more of: adjusting a beamformer, adjusting an RIS selection, adjusting a channel quality indicator for the victim UE, or adjusting a data rank.

22. The apparatus of claim 19, wherein the one or more processors are further configured to:
transmit, to the victim UE, an additional DCI with a request for the victim UE to transmit the interference report to the network entity, wherein the additional DCI indicates one or more beam training occasions for which interference metrics are to be indicated in the interference report, and wherein the additional DCI indicates uplink control channel resources for transmitting the interference report from the victim UE to the network entity; or
transmit, to a non-victim UE, an additional DCI with a request for the non-victim UE to transmit a measurement report to the network entity, wherein the additional DCI indicates uplink control channel resources for transmitting the additional DCI from the non-victim UE to the network entity.

23. The apparatus of claim 22, wherein the interference metrics include one or more of a reference signal received power, a reference signal received quality, a signal to interference and noise ratio, or a modulation and coding scheme associated with the one or more beam training occasions.

24. An apparatus for wireless communication at a reconfigurable intelligence surface (RIS) controller, comprising:
one or more memories; and
one or more processors, coupled to the one or more memories, configured to:
receive, from a network entity, downlink control information (DCI) associated with an RIS beam training, wherein the DCI is a same DCI that configures both the RIS controller and one or more user equipments (UEs) for the RIS beam training; and
configure one or more beams for the one or more UEs based at least in part on the DCI associated with the RIS beam training.

25. The apparatus of claim 24, wherein the one or more UEs include:
serving UEs that are served by the network entity; and
victim UEs that are subjected to interference from reference signals reflected from an RIS associated with the RIS controller during the RIS beam training.

26. The apparatus of claim 24, wherein the DCI is a group common RIS training DCI for configuring the RIS controller and the UE for the RIS beam training, and wherein the DCI indicates one or more of: serving UE identifiers, victim UE identifiers, uplink control channel resource identifiers for serving UEs and uplink control channel resource identifiers for victim UEs, a quantity of beams to be reported by the serving UEs, or a quantity of interference metrics to be reported by the victim UEs.

27. The apparatus of claim 26, wherein the one or more processors, to configure the one or more beams, are configured to:

set the one or more beams based at least in part on historical beams used to serve the serving UEs associated with the serving UE identifiers; or
set the one or more beams based at least in part on a positioning associated with the serving UEs.

28. The apparatus of claim 26, wherein the one or more processors, to configure the one or more beams, are configured to:
restrict use of the one or more beams in directions associated with the victim UEs based at least in part on historical beams that caused interference for the victim UEs, wherein the historical beams are identified based at least in part on the victim UE identifiers.

29. The apparatus of claim 24, wherein the DCI includes a first DCI and a second DCI, wherein the first DCI is a group common RIS training DCI for the RIS controller and the one or more UEs and the second DCI is specific to the one or more UEs, wherein the first DCI indicates one or more of: serving UE identifiers, victim UE identifiers, or a time and frequency resource allocation associated with the second DCI, and wherein the second DCI indicates one or more of: victim UE identifiers, uplink control channel resource identifiers for serving UEs and uplink control channel resource identifiers for victim UEs, a quantity of beams to be reported by the serving UEs, or a quantity of interference metrics to be reported by the victim UEs.

30. The apparatus of claim 24, wherein the RIS controller is associated with an RIS, wherein the RIS includes a plurality of elements that reflect signals received from the network entity toward one or more directions associated with the one or more UEs.

* * * * *